July 19, 1955
R. J. REID
2,713,562
TERNARY POLYMER COMPOSITIONS
Filed March 18, 1953
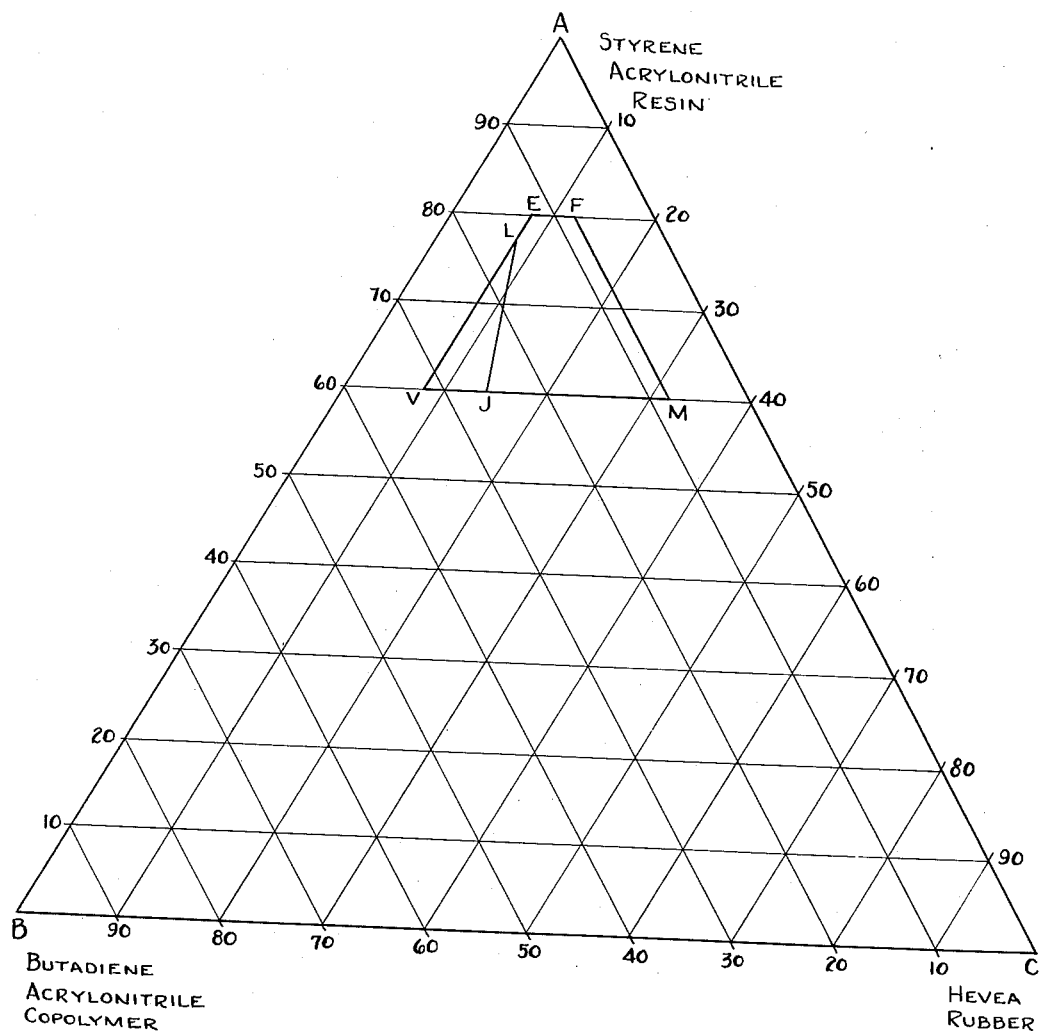
INVENTOR.
ROBERT J. REID
BY
W. A. Fraser
ATTY.

United States Patent Office 2,713,562
Patented July 19, 1955

2,713,562
TERNARY POLYMER COMPOSITIONS

Robert J. Reid, Canal Fulton, Ohio, assignor to The Firestone Tire & Rubber Company, Akron, Ohio, a corporation of Ohio Application March 18, 1953, Serial No. 343,227

2 Claims. (Cl. 260—4)

This invention relates to novel three-component compositions having outstanding combinations of properties, particularly hardness, low temperature impact strength and resistance to distortion by heat.

A number of combinations of various high polymeric substances have heretofore been proposed as having desirable properties above and beyond those of the individual constituent polymeric substances. One such combination comprises a blend of (A) a butadiene-acrylonitrile elastomeric copolymer with (B) a styrene-acrylonitrile copolymer. However, these compositions have been found to be deficient in certain combinations of properties, notably hardness, impact strength (particularly impact strength at low temperature) and heat distortion temperature; if such compositions are compounded so as to enhance one of these properties, others of the properties suffer, and vice versa.

Accordingly, it is an object of this invention to provide novel multicomponent resinous compositions having superior combinations of properties.

Another object is to make use of the butadiene-acrylonitrile elastomeric copolymers and styrene-acrylonitrile copolymers to produce compositions of superior properties.

A further object is to provide such compositions which will be characterized by simultaneous and concurrent excellence in a plurality of their properties, notably low temperature impact strength, hardness, modulus of elasticity and resistance to heat distortion.

A still further object is to provide such compositions which involve the use only of inexpensive and readily available materials.

The invention will be described in connection with the accompanying drawing, which is a trilinear diagram showing the range of proportions of the constituents of the compositions of this invention.

SYNOPSIS OF THE INVENTION

It has been discovered by this invention that, particularly within a certain range of compositions, the replacement, with natural rubber (i. e. hevea rubber), of a portion of the butadiene-acrylonitrile copolymers in compositions of these materials with styrene-acrylonitrile copolymers, results in a simultaneous enhancement of the modulus of elasticity, hardness, low temperature impact strength and heat resistance of these compositions. The resultant preferred hard, rigid polymeric compositions in accordance with this invention fall within the following special ranges:

| | Per cent |
|---|---|
| Styrene-acrylonitrile copolymer | 60–80 |
| Butadiene-acrylonitrile elastomeric copolymer | 8–32 |
| Natural (hevea) rubber | 8–32 |

The aforesaid percentages are based on the combined total weight of said copolymers in the composition. In turn, the combined total weight of the copolymers constitutes at least 85% by weight of the total composition, any balance being made up of miscellaneous compounding agents such as pigments, vulcanizing agents, stabilizers, plasticizers, etc. The desirable properties of the compounds of this invention are all the more remarkable when it is considered that elevated heat distortion temperature and increased impact strength are largely conflicting properties, and factors tending to enhance the one will usually depress the other. Likewise, hevea rubber is incompatible with styrene-acrylonitrile copolymers individually, and the formation of a successful ternary composition from these components would not be expected.

Referring to the drawing, this is a trilinear composition diagram, the vertices A, B and C of which represent respectively the styrene-acrylonitrile copolymer, the butadiene-acrylonitrile copolymer and hevea rubber, i.e., the components of the compositions of this invention. It will be seen that the compositions corresponding to the schedule set out in the preceding paragraph all lie within the polygon EFMV on the diagram. It will be noted that certain of the applicant's examples (Table I, items Nos. 3 and 5) fall within a small triangular portion of this polygon, namely the triangle LJV, the coordinates of the vertices of which may be tabulated as follows:

| | Coordinates | | |
|---|---|---|---|
| | A (Styrene-Acrylonitrile Copolymer), percent | B (Butadiene-Acrylonitrile Copolymer), percent | C (Hevea Rubber), percent |
| First Vertex | 60 | 26 | 14 |
| Second Vertex | 60 | 32 | 8 |
| Third Vertex | 77 | 15 | 8 |

THE STYRENE-ACRYLONITRILE RESINOUS COPOLYMERS

Styrene and acrylonitrile are known to copolymerize under free-radical catalysis in various ratios to yield resinous materials. The "azeotropic" composition, i. e., the composition at which the styrene and acrylonitrile will enter the copolymer in the same ratio in which the monomers are present in the polymerization mass, is approximately 78% styrene, 22% acrylonitrile, and it will be preferred and most convenient to employ copolymers of this composition. However for the purpose of this invention the proportions may vary from 55 to 80% styrene, balance acrylonitrile. Other factors being constant, with an increase in the acrylonitrile content of the resinous copolymer, the hardness, modulus of elasticity, and impact strength of the resulting composition prepared according to this invention will likewise increase. In those cases where it is desired to prepare copolymers in which the styrene content departs greatly from the "azeotropic" value, say more than 5% in either direction, the polymer should be prepared by an incremental technique, in which the ratio of as-yet-unpolymerized styrene to as-yet-unpolymerized acrylonitrile in the polymerizing mass is maintained constant by periodic addition of the monomer which is in excess of the azeotropic proportion. When this technique is employed, the copolymer product will be "homogeneous" in that all polymer molecules have substantially the same composition. The concentration of the as-yet-unpolymerized monomers in any polymerization mass and the composition of the polymers formed are related by the equation (1) $$\frac{dM_1}{dM_2} = \frac{M_1}{M_2} \cdot \frac{M_1 r_1 + M_2}{M_2 r_2 + M_1}$$

under the notation of Lewis et al. J. A. C. S. 70:1519–23, wherein, as applied to the present instance, all quantities being on a molar basis $\frac{dM_1}{dM_2}$ = the ratio of styrene to acrylonitrile in the copolymer currently being formed at the time under consideration $M_1$ = the concentration of as-yet-unpolymerized styrene in the reaction mixture at the time under consideration $r_1 = 0.41$ = reactivity ratio for styrene $M_2$ = concentration of as-yet-unpolymerized acrylonitrile in the charge at the time under consideration $r_2 = .04$ = reactivity ratio for acrylonitrile In order to prepare a "homogeneous" copolymer, the ratio of styrene and acrylonitrile required in the monomer mixture in order to produce a copolymer of the desired composition is calculated from the Equation (1), and these monomers charged in the calculated ratio into the polymerization mixture. The polymerization is then started, the reaction mass analyzed from time to time, and additional styrene or acrylonitrile added to bring the ratio of as-yet-unpolymerized styrene to as-yet-unpolymerized acrylonitrile back to its original value. These copolymers may be produced by polymerizing the monomers in any conventional free radical systems, either solution, mass, emulsion or suspension. The polymerization mass may contain modifiers or "chain-transfer agents" such as lauryl mercaptan and other fatty mercaptans. Compositions according to this invention containing styrene-acrylonitrile copolymers prepared in the presence of these modifiers band readily on the roll mill; however, they do not "break down" during milling, and sheeted products made therefrom are apt to ruffle unless care is taken during any hot-post-forming operations conducted thereon. The products do, however, have better hot strength and better deep-drawing behavior than comparable materials made from styrene-acrylonitrile copolymers prepared in the absence of modifiers. In general, the modified copolymers will have a relative viscosity, in 1% solution in acetone at 25° C., of about 1.4–2.0. Compositions containing the unmodified copolymers, although they are difficult to band on the mill, do ultimately break down smoothly, and sheeted products made therefrom are less susceptible of ruffling during hot-post-forming.

THE BUTADIENE-ACRYLONITRILE ELASTOMERIC COPOLYMERS

These are well known commercial hydrocarbon-resistant synthetic rubbery materials which are copolymers of 55–85% butadiene, balance acrylonitrile based on the weight of the copolymers. In general, other variables being fixed, the greater the amount of acrylonitrile in a butadiene-acrylonitrile copolymer, the greater will be the hardness, modulus of elasticity and room temperature impact strength of compositions made therefrom in accordance with this invention. Low temperature properties are favored by lower acrylonitrile contents, however. The best all-around properties will be obtained with those copolymers containing about 75% butadiene, 25% acrylonitrile. Commercially, these synthetic rubbers are produced in a free radical catalysed emulsion polymerization system, usually in the presence of small amounts of chain-transfer agents such as are mentioned above in connection with the styrene-acrylonitrile copolymers. These agents are ordinarily used to some extent even when their modifying action is not required, in order to activate the catalysts in the system. Similarly to the styrene-acrylonitrile system, butadiene and acrylonitrile have a preferred "azeotropic" copolymerization proportion which is 63% butadiene, balance acrylonitrile. If it is desired to depart from this ratio, it may be advantageous to employ an increment technique such as described above in connection with the styrene-acrylonitrile copolymers. In the present case, the reactivity ratio $r_1$, for butadiene is 0.35 and the reactivity ratio $r_2$ for acrylonitrile is .04, determined in solution polymerization systems. These values will be slightly different in emulsion polymerization systems, but the values for solution systems will be accurate enough for practical purposes.

COMPOUNDING OF THE COMPOSITIONS OF THIS INVENTION

The three polymeric components (styrene-acrylonitrile resin, butadiene-acrylonitrile copolymer and natural rubber) employed in this invention may be blended by a variety of techniques and apparatus. Since all three components are commercially obtainable in the latex form, they may be blended by mixing together the latices and adding a coagulant to coprecipitate the materials as a homogeneous blend. Alternatively, the solid components may be blended together on a roll mill or in a Banbury mill. Even when the components are blended together by coprecipitation from the latex, it will often be desirable, particularly when the styrene-acrylonitrile copolymers are unmodified, i. e., prepared at low temperatures in the presence of only small amounts of chain transfer agents, or no chain-transfer agents whatever, to work the compositions on a suitable mill in order to break them down and render them more amenable to subsequent calendering or other fabricating operations. As noted above, the unmodified copolymers are much more responsive to such milling operations than the modified copolymers, and eventually break down into a smooth band to form a compound which will accept and retain the shape ultimately imposed thereon. The milling should preferably not be excessively prolonged, i. e., should not extend beyond 20 minutes to 40 minutes at conventional milling speeds and gaps, in order to avoid discoloration of the compound and degradation of properties.

It is to be understood that compositions according to this invention may contain miscellaneous additional compounding agents, such as pigments on the order of carbon black, zinc oxide, titanium dioxide, etc.; vulcanizing ingredients such as sulfur and accelerators; plasticisers such as dioctyl phthalate, dioctyl sebacate and the like; and light and/or heat stabilizing substances such as phenyl salicylate, lead stearate and the like. The composition as a whole will have the advantageous properties of the compositions of this invention, provided that the total weight of styrene-acrylonitrile and butadiene-acrylonitrile copolymers and natural rubber constitutes at least 85% of the entire mixture, the balance of which is constituted of conventional stabilizers, plasticizers, pigments, reinforcing agents and the like.

THE PROPERTIES AND USES OF THE COMPOSITIONS OF THIS INVENTION

The ternary compositions of this invention are sharply distinguished, from compositions involving binary mixtures of the styrene-acrylonitrile copolymers with the butadiene-acrylonitrile copolymers, in their greatly enhanced toughness and resistance to impact, particularly at low temperatures.

Compositions according to this invention may be used in a variety of applications, and are of particular advantage in relatively heavy semi-rigid sheetings approximately .1 to .30 inch thick adapted for use direct as flat panellings, etc., or for post-forming into simple or compound curved panellings for automotive and other vehicle interiors; automotive wheel housings; formed luggage shells; sink and drainboard shells and other plumbing equipment, counters and enclosures; interior architectural trim; appliance standards, racks and the like; large display letters, signs and the like; sales racks; tote-boxes for use in manufacturing and order-assembly establishments; and cabinets for radio and television receivers. The compositions are readily calendered out at moderate temperatures into sheetings of the type above described, and withstand the necessary hot working without noticeable change in properties or appearance; the sheetings may be post-formed at relatively low temperatures, and accept relatively deep draws without undue localized attenuation. In the finished fabricated articles the materials have excellent dimensional stability and sufficiently high heat distortion points, usually 85–90° C. or better, so as to hold any shapes into which they may be fabricated. Their excellent impact strengths ensure their freedom from cracking or shattering under any stresses and shocks likely to be encountered in service. This excellent impact strength is retained even at low temperatures, which is important in the case of vehicle or aircraft panellings which may be exposed to winter temperatures. The compositions of this invention may also be employed for compression or injection molding of various objects.

With the foregoing general discussion in mind, there is given herewith a detailed example of the practice of this invention.

*Example*

A series of compositions was made up from styrene-acrylonitrile copolymers, butadiene-acrylonitrile copolymers and natural (hevea) rubber. In certain cases, the mixtures were blended by mixing the solid components on a roll mill at moderate temperatures, on the order of 340°–355° F. (stock temperature); in other cases, latices of the several materials, in quantities calculated to contain the materials in the required proportions, were stirred together and coprecipitated by addition of calcium chloride. The coprecipitated mass was then washed to remove salts as far as was practical, dried, and then milled at 340°–355° F. (stock temperature). The particular method of mixing, whether by milling or latex blending, did not seem greatly to affect the properties of the resulting compositions.

The blended compositions were then pressed out in a flat platen heated press at 350° F. to form sheets one-eighth inch thick. The mechanical properties of these plaques were determined, and are tabulated herewith.

TABLE I

| Weight Ratio of Components | | | Mechanical Properties | | | | Item No. |
| --- | --- | --- | --- | --- | --- | --- | --- |
| Styrene Acrylonitrile Copolymer a A | Butadiene Acrylonitrile Copolymer b B | Natural (hevea) Rubber | Izod Impact Strength In Foot-Pounds per Square Inch At— | | Hardness (Rockwell R-scale) | Heat Distortion Temp. (° C.) | |
| | | | 25° C. | −10° C. | | | |
| 60 | 10 | 30 | 1.8 | | 52 | 90 | 1 |
| 60 | 15 | 15 | 7.8 | | 54 | 83 | 2 |
| 60 | 30 | 10 | 10.6 | | 49 | 81 | 3 |
| 65 | 18 | 17 | 7.7 | 1.6 | 78 | 88 | 4 |
| 65 | 25 | 10 | 7.8 | 3.5 | 89 | 89 | 5 |
| 65 | 10 | 25 | 4.8 | 1.5 | 90 | 92 | 6 | a This is a copolymer of 78% styrene and 22% acrylonitrile by weight. The copolymer was prepared in an aqueous system with a soap emulsifier, and 0.2% by weight of the monomer of a mixture of tertiary alkyl mercaptans (Sulfole B-8, a product of the Phillips Petroleum Company).
b This is a copolymer of 75% butadiene, 25% acrylonitrile.

From the foregoing general discussion and detailed specific example, it will be evident that this invention provides novel plastic materials having unique and desirable properties adapting them to many and varied uses. The several components of the compositions are cheaply and abundantly available.

What is claimed is:

1. A hard, tough, homogeneous mixture of (A) 60–80% of a styrene-acrylonitrile copolymer containing 55–80% of styrene, (B) 8–32% of a butadiene-acrylonitrile copolymer containing 55–85% of butadiene, (C) 8–32% of hevea natural rubber; the aforesaid percentages of (A), (B) and (C) being based on the total of their weights in the mixture.

2. A hard, tough, homogeneous mixture of (A) a styrene-acrylonitrile copolymer containing 55–80% of styrene, (B) a butadiene-acrylonitrile copolymer containing 60–80% of butadiene, (C) hevea natural rubber; the point representing said mixture on the trilinear diagram of (A), (B) and (C) lying within the triangle whose vertices have the following coordinates:

| | Coordinates | | |
| --- | --- | --- | --- |
| | (A) Percent | (B) Percent | (C) Percent |
| First Vertex | 60 | 26 | 14 |
| Second Vertex | 60 | 32 | 8 |
| Third Vertex | 77 | 15 | 8 |

No references cited.